(12) United States Patent
Lenczowski

(10) Patent No.: US 11,724,313 B2
(45) Date of Patent: Aug. 15, 2023

(54) SCANDIUM-CONTAINING ALUMINUM ALLOY FOR POWDER METALLURGICAL TECHNOLOGIES

(71) Applicant: Airbus Defence and Space GmbH, Taufkirchen (DE)

(72) Inventor: Blanka Lenczowski, Neubiberg (DE)

(73) Assignee: Airbus Defence and Space GmbH

( * ) Notice: Subject to any disclaimer, the term of this patent is extended or adjusted under 35 U.S.C. 154(b) by 0 days.

(21) Appl. No.: 17/831,595

(22) Filed: Jun. 3, 2022

(65) Prior Publication Data

US 2022/0297244 A1 Sep. 22, 2022

Related U.S. Application Data

(62) Division of application No. 15/376,878, filed on Dec. 13, 2016, now Pat. No. 11,433,489.

(30) Foreign Application Priority Data

Dec. 14, 2015 (EP) .................................. 15199831

(51) Int. Cl.
| | | |
|---|---|---|
| *B22F 9/08* | (2006.01) | |
| *C22C 21/08* | (2006.01) | |
| *C22C 21/00* | (2006.01) | |
| *C22C 1/04* | (2023.01) | |
| *B22F 5/12* | (2006.01) | |
| *B23K 35/28* | (2006.01) | |
| *C22F 1/04* | (2006.01) | |
| *C22F 1/02* | (2006.01) | |

(52) U.S. Cl.
CPC .................. *B22F 9/08* (2013.01); *B22F 5/12* (2013.01); *B23K 35/288* (2013.01); *C22C 1/0416* (2013.01); *C22C 21/00* (2013.01); *C22C 21/08* (2013.01); *B22F 2301/45* (2013.01); *C22F 1/02* (2013.01); *C22F 1/04* (2013.01)

(58) Field of Classification Search
CPC .............................. B23K 35/288; C22C 21/08
See application file for complete search history.

(56) References Cited

U.S. PATENT DOCUMENTS

| | | |
|---|---|---|
| 6,139,653 A | 10/2000 | Fernandes et al. |
| 6,258,318 B1 | 7/2001 | Lenczowski et al. |
| 6,531,004 B1 | 3/2003 | Lenczowski et al. |
| 6,676,899 B2 | 1/2004 | Davydov et al. |
| 2003/0156967 A1* | 8/2003 | Davydov ................. C22C 21/06 420/541 |
| 2006/0093512 A1 | 5/2006 | Pandey |
| 2007/0240796 A1 | 10/2007 | Koch et al. |
| 2009/0226343 A1* | 9/2009 | Telioui ..................... C22C 21/06 420/544 |
| 2010/0319817 A1 | 12/2010 | Norman et al. |
| 2013/0312876 A1 | 11/2013 | Palm |
| 2015/0027595 A1* | 1/2015 | Palm ......................... C22F 1/04 148/552 |

FOREIGN PATENT DOCUMENTS

| | | |
|---|---|---|
| CA | 2398667 A1 | 6/2002 |
| CN | 1275172 A | 11/2000 |
| CN | 1404533 A | 3/2003 |
| CN | 104342588 A | 2/2015 |
| DE | 10352932 A1 | 6/2005 |
| DE | 102013012259 B3 | 10/2014 |
| EP | 2546373 A1 | 1/2013 |
| JP | S52011143 A | 1/1977 |
| JP | 2004516385 A | 6/2004 |
| JP | 2007092117 A | 4/2007 |
| JP | 2008013826 A | 1/2008 |
| JP | 2009504918 A | 2/2009 |
| JP | 2015025202 A | 2/2015 |
| RU | 2237097 C1 * | 9/2004 |

OTHER PUBLICATIONS

Machine Translation RU 2237097 (Year: 2022).*
Chinese Search Report for Application No. CN 201611272966.6 dated Oct. 31, 2019, 1 page.
EP Search Report dated Jun. 15, 2016 (EP 15199831.7).
M. Song & Y.-H. He (2011) Investigation of primary Al3(Sc,Zr) particles in Al-Sc-Zr alloys, Materials Science and Technology, 27: 1, 431-433, DOI: 10.1179/174328409X443236 https://www.tandfonline.com/doi/full/10.1179/174328409X443236?needAccess=true (Year: 2011).
Particle Size/Mesh Conversion Chart Powder Technology Inc. https://web.archive.org/web/20130414032858/http:l/www.powdertechnologyinc.com/particle-size-mesh-conversion-chart/. 3 Pages. Apr. 14, 2013. (Year: 2013).

* cited by examiner

*Primary Examiner* — Alexandra M Moore
(74) *Attorney, Agent, or Firm* — Lerner David LLP

(57) ABSTRACT

A scandium-containing aluminium powder alloy, wires and materials including said alloy, and a method for producing the scandium-containing aluminium powder alloy, the wires and materials, the proportion of scandium in the scandium-containing aluminium powder alloy being elevated, are disclosed. At least one element is selected from the group consisting of the lanthanum group except for Ce, Y, Ga, Nb, Ta, W, V, Ni, Co, Mo, Li, Th, Ag.

9 Claims, No Drawings

SCANDIUM-CONTAINING ALUMINUM ALLOY FOR POWDER METALLURGICAL TECHNOLOGIES

CROSS-REFERENCE TO RELATED APPLICATION

The present application is a divisional application of U.S. application Ser. No. 15/376,878 filed on Dec. 13, 2016, the disclosures of which are incorporated by reference herein.

FIELD OF THE INVENTION

The present invention relates to a scandium-containing aluminium powder alloy, to wires and materials which comprise said alloy, and to a method for producing the scandium-containing aluminium powder alloy, the wires and materials, the proportion of scandium in the scandium-containing aluminium powder alloy being elevated.

BACKGROUND OF THE INVENTION

Owing to the low densities thereof, aluminium alloys are of particular importance for aviation. In the past, aluminium-copper-magnesium and aluminium-zinc-magnesium alloys were primarily used, but said alloys cannot be welded. Thus, in previous years, new weldable alloys were developed for the outer skin (sheet metal) and stringers (sheet metal or extruded profiles) of the aircraft fuselage structure, which are disclosed for example in U.S. Pat. No. 6,258,318 B1, U.S. Pat. No. 6,676,899 B2, and US2003/0156967 A1.

The alloys disclosed in the above-mentioned documents are suitable for example as wrought alloys for producing sheet metal structures and extruded profiles. Furthermore, research has been carried out in order to improve the material properties by applying powder metallurgy.

In order to fully benefit from the advantages of powder technology and of processes which are partially based on powder technology such as spraying processes and ALM (additive layer manufacturing) process technologies—depending on the application of the components—it is advantageous to design process-optimised alloys. It is thus possible to be able to use resource-efficient and effective material innovations as a key for optimising the component properties—in parallel with the geometrical component design. These requirements can conventionally be achieved by modifying the alloy, varying the crystallisation conditions and adapting the manufacturing conditions, such as a subsequent heat treatment. Furthermore, it is advantageous to support alloy-specific construction and finishing of components such as by means of local cooling/heating in order to relieve stress (internal stresses) or by minimising the material defects from the solidification by means of subsequent heat treatment.

Nowadays, standard materials are predominantly used for ALM processes and spraying processes, for example in the case of Ti alloys, primarily the material Ti6Al4V is used, and in the case of Al alloys, AlSi10Mg is used.

In this case, the ALM processes primarily provide technological competition for precision-casting technologies, which are primarily used for producing complex and—depending on the alloy—thin-walled, load-optimised components for aviation or medical technology. For the precision-casting process, the aluminium alloy A357 (AlSi7Mg0.6) is commonly used for thin-walled structures and A201/KO1 (AlCu5MgTiAg) is commonly used as a stronger variant for components having greater wall thicknesses.

There is a need for additional alloys which can be used for manufacturing high-strength components and which can be processed in a simple manner.

BRIEF SUMMARY OF THE INVENTION

One of the ideas of the present invention is thus that of providing an alloy which can be used simply during processing in order to produce high-strength materials.

The present invention thus relates to a new, high-strength, weldable scandium-containing aluminium powder alloy, in particular an Al—Mg—Sc alloy (5xxx), which can optionally be shaped into a wire, and which is suitable, inter alia, for application in powder metallurgical technologies, inter alia, also for additive layer manufacturing (ALM) and spraying processes, or as a welding filler material or for producing semi-finished products or complete components. As a result of the different process control for conventional Al—Mg—Sc-based alloys, conventionally extruded semi-finished products do not achieve the high mechanical properties of rolled structures, and so a new formulation using powders can provide a remedy for this. Conventionally, high strength values of considerably greater than 400 MPa are also only achieved using wrought alloys, but said alloys cannot be poured or can only be poured with great difficulty in the normal casting process.

One concept on which the present invention is based consists in the fact that the proportion of scandium in the powder alloy according to the invention can be increased, as a result of which the strength of the powder alloy can be improved, as well as that of wires and materials which are produced from said alloy.

For this purpose, research has been carried out in order to improve the material properties by applying powder metallurgy. It has been found that the strength-increasing potential of scandium can be used in that, by increasing the cooling rate during the solidification, more scandium is dissolved in the mixed crystal (i.e. for example more than 0.35% by weight Sc, in particular more than 0.56% by weight based on the mixed crystal or an alloy powder which comprises said crystal) than in conventional production methods in ingot metallurgy (IM), and the dissolved proportion of Sc can then be used in the next step. By adding or generating alloy elements which form spherical, intermetallic phases and optionally also reduce diffusion, thermally stable alloys of this type can be used for powder technology and provide numerous advantages. By means of an adapted cooling rate, a powder having a suitable powder size, powder form, and microstructure can be obtained, for example by means of atomisation or spraying, and in additional processes, for example powder metallurgy (sintering, hot isostatic pressing, compressing, etc.) and by means of additional processes based on powder technology such as ALM (powder-bed, etc.) or spraying processes, can be processed into semi-finished products or finished components/components, e.g. by spraying on stringers and/or reinforcing elements (e.g. onto a sheet), and/or into functional layers. From the scandium-containing aluminium powder alloy according to the invention, materials such as welding filler materials can also be produced which can be used in additional machining, such as build-up welding.

By adding scandium, firstly the mechanical properties of the material and secondly the weldability and corrosion resistance can be improved by comparison with Sc-free alloys, the increased proportion having a positive effect in this case.

The configurations and developments described herein may be combined with one another in any desired manner, within reason. Further possible configurations, developments and implementations of the invention also do not comprise explicitly mentioned combinations of features of the invention described previously or in the following with respect to the embodiments. In particular, in the process a person skilled in the art will also add individual aspects as improvements or additions to the relevant basic form of the present invention.

DETAILED DESCRIPTION

In the following, the invention will be described in greater detail with reference to embodiments.

According to a first aspect, the present invention relates to a scandium-containing aluminium powder alloy, comprising, in % by weight, based on the total composition of the alloy

| | |
|---|---|
| Mg | 0.5-10 |
| Sc | 0.1-30, preferably 0.4-3, more preferably 0.6-3 |
| Zr | 0.05-1.5 |
| Mn | 0.01-1.5 |
| Zn | 0-2.0 |
| Ti | 0.01-0.2 |
| Ce | ≤0.25 |
| Be | 0-0.004 |
| B | 0-0.008 |
| Si | ≤0.25 |
| Fe | ≤0.25 |
| Hf | ≤0.5, preferably 0.15-0.25 | at least one element which is selected from the group consisting of the lanthanum group except for Ce (La, Pr, Nd, Pm, Sm, Eu, Gd, Tb, Dy, Ho, Er, Tm, Yb, Lu), Y, Ga, Nb, Ta, W, V, Ni, Co, Mo, Li, Th, Ag, the proportion of these elements being at most 0.5, and Al as the remainder, comprising further impurities of in total at most 0.5% by weight.

In the scandium-containing aluminium powder alloy according to an embodiment of the invention, by means of the Sc, the strength can be increased, and weldability can be improved. Preferably, the proportion of Sc in the alloy, based on the total composition of the alloy, is 0.4-3.0% by weight, more preferably 0.6-3% by weight. By means of the method according to the invention for producing the scandium-containing powder alloy, in this case, a proportion of Sc in the powder can be achieved which is above the solubility of Sc in the alloy at 600° C., which can be for example 0.56% by weight, based on the alloy. The scandium-containing aluminium powder alloy according to an embodiment of the invention can contain 0.1-30% by weight scandium, based on the total composition, the scandium proportion in the alloy possibly depending on the cooling rate during the production of the powder and on the grain diameter to be produced for the particles in the powder. In general, a decreasing powder size and a higher cooling rate result in a higher scandium content. In this case, according to specific embodiments, the maximum sectional length inside a particle, that is to say the maximum length of a straight line inside the particle between two outer faces or surface points of the particle, can be considered to be the grain diameter of the particle in the scandium-containing aluminium powder alloy according to the invention.

According to specific embodiments, the proportion of Zr is at most half (i.e. 50% by weight), preferably at most ⅓ of the % by weight of the proportion of Sc in the scandium-containing aluminium powder alloy. In this case, increased high-temperature strength and improved stability can be achieved owing to the proportion of Zr. In formed primary particles, Sc can be replaced with the proportion of Zr, and therefore primary particles having the formula Al3(Sc$_{1-x}$Zr$_x$), x<1 can be formed, as is described for example in DE 103 52 932 A1.

By adding zinc, excellent corrosion resistance can also be achieved after long-term exposure at elevated temperatures, even if the alloy is in the form of powders or wire. As a result, the powders or wires are suitable, inter alia, for application with powder metallurgical technologies, inter alia, also for additive layer manufacturing (ALM) and spraying processes, or as a welding filler material or also for producing semi-finished products or complete components. According to specific embodiments, the proportion of Zn in the scandium-containing aluminium powder alloy according to the invention is 0.05-2.0% by weight, preferably 0.1-1.5% by weight, more preferably 0.2-1.0% by weight, based on the total composition.

The proportion of Hf in the alloy according to an embodiment of the invention is 0-0.5% by weight, according to specific embodiments 0.15-0.25% by weight, based on the alloy. An overly high proportion of Hf in the alloy can reduce the solubility of Sc in the alloy.

In the alloy according to an embodiment of the invention, the lanthanum group comprises lanthanum (La) and the subsequent elements of the lanthanides Ce, Pr, Nd, Pm, Sm, Eu, Gd, Tb, Dy, Ho, Er, Tm, Yb, Lu, and one or more elements thereof can be present in the scandium-containing aluminium powder alloy according to an embodiment of the invention, in addition to or instead of one or more of the elements which are selected from Y, Ga, Nb, Ta, W, V, Ni, Co, Mo, Li, Th, Ag. However, the proportion of all these elements except for Ce in the scandium-containing aluminium powder alloy according to an embodiment of the invention is no more than 0.5% by weight, based on the total composition of the powder alloy. However, as a result of the fact that at least one of these elements is present in the scandium-containing aluminium powder alloy according to an embodiment of the invention, the proportion of this group is, however, greater than 0% by weight.

In addition to the above-mentioned elements, the scandium-containing aluminium powder alloy according to an embodiment of the invention can contain additional elements as unavoidable impurities which may be introduced into the alloy for example through processing and/or owing to the starting substances used.

According to specific embodiments, the proportion of the sum of Zr+Ti in the scandium-containing powder alloy according to an embodiment of the invention is less than ⅓ of the % by weight of the proportion of Sc. In this case, zirconium and titanium have a similar effect to Sc and lead to improved strength and thermal stability, but when the proportion thereof is too high, they can lead to a reduction in the proportion of Sc.

According to specific embodiments, the particles of the powder of the scandium-containing aluminium powder alloy have a grain diameter of from 1 to 250 μm, preferably of from 5 to 150 μm. A corresponding determination of the grain diameter of the powder takes place in this case according to specific embodiments by means of sieve analysis, it being possible to carry out the sieve analysis in this case using sieves having a corresponding mesh size, that is to say for example using sieves having mesh sizes of 1, 5, 20, 60, 90, 150 and 250 μm. The sieve analysis is not particularly restricted in this case, and can be carried out for example using sieving machines from the company Retsch or also using other sieving machines. Particles having a desired particle size—e.g. for corresponding further processing or according to further processes and/or the application—can be obtained from the scandium-containing aluminium powder alloy according to the invention for example by sifting out corresponding fractions.

According to another aspect, the present invention relates to a method for producing the scandium-containing aluminium powder alloy according to the invention, a mixture comprising, in % by weight, based on the total composition of the mixture,

| | |
|---|---|
| Mg | 0.5-10 |
| Sc | 0.1-40, preferably 0.1-30, more preferably 0.4-3, most preferably 0.6-3 |
| Zr | 0.05-1.5 |
| Mn | 0.01-1.5 |
| Zn | 0-2.0 |
| Ti | 0.01-0.2 |
| Ce | ≤0.25 |
| Be | 0-0.004 |
| B | 0-0.008 |
| Si | ≤0.25 |
| Fe | ≤0.25 |
| Hf | ≤0.5 | at least one element which is selected from the group consisting of the lanthanum group except for Ce (La, Pr, Nd, Pm, Sm, Eu, Gd, Tb, Dy, Ho, Er, Tm, Yb, Lu), Y, Ga, Nb, Ta, W, V, Ni, Co, Mo, Li, Th, Ag, the proportion of these elements being at most 0.5, and Al as the remainder, comprising further impurities of in total at most 0.5% by weight, being melted, sprayed or atomised and cooled at a cooling rate of more than 10 K/s, preferably more than $10^2$ K/s, more preferably more than $10^3$ K/s.

In the method for producing the scandium-containing aluminium powder alloy according to an aspect of the invention, the alloy can be produced by means of a mixture, for example a master alloy, which can also contain more than 30% by weight scandium, but for reasons of cost, it is preferable to suitably adjust the proportion of Sc in order to accordingly minimise losses of Sc.

In this case, the melting of the mixture is not particularly restricted and can take place in a suitable manner, e.g. also in a protective gas atmosphere. In this case, the melting can take place at a temperature of 700° C. or more, preferably 750° C. or more, more preferably 800° C. or more. According to specific embodiments, the melted mass can be kept at a specific temperature after the melting, the temperature and time at temperature possibly being dependent on the individual additional elements and the amount thereof.

According to specific embodiments, the atomisation or spraying can directly follow the melting, that is to say without a transportation step, these alternative steps not being particularly restricted and being able to take place by means of suitable spraying tools, nozzles, etc. According to specific embodiments, the melted mass can also be transported for atomisation or spraying, for example by means of a pipe, etc. Spraying can take place for example in a gas stream, for example in the case of gas spraying or gas atomisation, for example by means of oversaturated mixed crystals comprising Mg/Sc/Zr and other elements.

According to specific embodiments, in the method according to the invention, in order to produce the scandium-containing aluminium powder alloy, the cooling of the melted mixture can take place during and/or after the spraying or atomisation using an inert gas such as He, Ne, Ar, N or mixtures thereof. In this case, the gas stream or the amount of gas introduced can be suitably adjusted relative to the amount of sprayed or atomised mixture in order to achieve a corresponding cooling rate. Furthermore, for example the geometry when spraying or atomising the gas, as well as the location and the direction(s) of the gas input can also have an influence on the cooling rate and/or the particle size of the powder which is produced, and therefore a person skilled in the art has a corresponding, simple opportunity to adjust a suitable cooling rate and/or particle size and/or particle shape in the powder which is produced. By means of the inert gas, the particles of the powder alloy according to the invention can accordingly be deposited.

According to specific embodiments, the cooling takes place at a cooling rate of more than 10 K/s, preferably more than $10^2$ K/s, more preferably more than $10^3$ K/s. In this case, cooling can also take place at cooling rates of more than $10^5$ K/s, $10^6$ K/s or $10^7$ K/s, for example at $5\times10^7$ K/s or more, for example using He as the cooling gas. According to specific embodiments, in this case, the further processing takes place in a protective gas atmosphere comprising an inert gas, e.g. Ar, N, He, Ne or mixtures thereof. In this case, the cooling takes place in a preferably controlled manner, for example using inert gas.

By means of the method according to the invention, in particular a scandium-containing aluminium powder alloy is obtained which comprises mixed crystals, that is to say in addition to a primary phase and a secondary phase, not all the particles in the scandium-containing aluminium powder alloy having to have such a structure. Preferably, however, there is little or no primary phase. The presence of primary phases and secondary phases and the materials thereof can be identified in this case for example microscopically, for example by means of optical microscopy, TEM (transmission electron microscopy), SEM (scanning electron microscopy), etc., optionally in conjunction with analytical processes such as XPS (X-ray photoelectron spectroscopy), IR, etc., it also being possible to identify the alloy composition for example by means of wet chemical analysis. In particular in this case, according to specific embodiments, the primary phase can comprise an $Al_3(Sc, Zr)$ phase (parts of the Sc in the $Al_3Sc$ lattice being replaced with Zr), and the Sc in the mixed crystal is concentrated.

For a suitable cooling rate and powder size and form, in this case, the gas alloy component to mass flow ratio is important in particular, said ratio possibly depending on the precise chemical composition and thus the melting temperature—and accordingly on the viscosity of the melted mass—and therefore for example a higher gas velocity leads to a higher cooling rate of the powder and thus to a higher oversaturation of the mixed crystal with Sc. So that scandium can fully develop the "capabilities" thereof later on in the "processing process", it is advantageous for a specific ratio between bound scandium in the "starting material" in the form of the primary phase and scandium which is dissolved in the mixed crystal to be maintained so that a sufficient proportion of secondary phase can be precipitated, and thus the important precipitation hardening can take place at a later time. This is in particular the case as a result of the fact that, depending on the starting material or the starting mixture/mixture, in this case the cooling rate is higher than 10 K/s, preferably higher than $10^2$ K/s, more preferably $10^3$ K/s, and for higher scandium contents, up to $5\times10^7$K/s and more.

According to specific embodiments, the melted mass is sprayed/atomised in such a way that the powder grain is spherical and has as few satellites as possible, in particular having a grain diameter of from 1 to 250 μm, preferably from 5 to 150 μm. For various applications of the scandium-containing aluminium powder alloy according to the invention, preferred grain diameters form in this case, for example for ALM 20-60 μm, and for additional spraying processes 5-90 μm, for example 5-60 μm, or also other ranges. Preferably, the primary particles of the A13(Sc, Zr) phase of the primary phase are no greater than 20 μm, more preferably less than 15 μm, most preferably less than 2 μm. Preferably, there is no primary phase.

According to another aspect, the present invention relates to a wire comprising the scandium-containing aluminium powder alloy according to an embodiment of the invention. According to specific embodiments, the wire consists of the scandium-containing aluminium powder alloy according to an embodiment of the invention. Furthermore, the wire is not further restricted and can have any desired length and thickness as well as any desired shape. For example, in the transverse direction, the wire can have a round cross section, but also an angular cross section, etc. For the further processing of the wire, however, according to specific embodiments, it is preferable for the wire to have a low thickness so that, after melting, said wire can be cooled at a high cooling rate of for example more than 10 K/s, preferably more than $10^2$ K/s, more preferably more than $10^3$ K/s. For this purpose, in the transverse direction, the wire can have for example a diameter (in the case of a round cross section) or a maximum sectional length in the transverse direction (for example from corner to corner or edge to edge) of 0.6-5 mm, preferably 0.8-1.6 mm.

The production from the method according to an aspect of the invention is not particularly restricted and can comprise conventional processes, for example pressing into a bar or ingot, followed by drawing the wire, or compacting in a casing, followed by wire drawing. According to specific embodiments, the production of the wire takes place by means of pressing and drawing into a wire, the process parameters such as the pressure during the pressing, the drawing speed during the wire drawing, etc. not being particularly restricted and being able to be suitably adjusted.

According to another aspect, the present invention relates to a material or a workpiece which comprises the scandium-containing aluminium powder alloy according to an embodiment of the invention or the wire according to an embodiment of the invention which is produced therefrom. In this case, the material or the workpiece is not particularly restricted. For example, the material can be a welding filler material in which, in addition to the powder alloy according to an embodiment of the invention, additional components can be contained. Examples of workpieces include for example components or semi-finished products which have been produced using the scandium-containing aluminium powder alloy according to an embodiment of the invention or the wire according to an embodiment of the invention. The components which are additionally contained in the component or semi-finished product are not particularly restricted and can be for example components from the automotive, aviation or aerospace industry or from medical technology.

According to specific embodiments, the scandium-containing aluminium powder alloy is present in the workpiece or material, for example in a workpiece such as a component or a semi-finished product, in a functional layer. Such a layer can be deposited for example by means of powder technology, for example by means of ALM using lasers and a cooling gas.

The method for producing a corresponding workpiece or material from the powder alloy according to an embodiment of the invention is not particularly restricted and can comprise conventional processes such as compacting, melting, sintering, etc.

According to another aspect, however, the present invention comprises a method for producing a material or workpiece according to an aspect of the invention, the scandium-containing aluminium powder alloy according to an embodiment of the invention or the wire according to an embodiment of the invention being heated and subsequently cooled at a cooling rate of more than 10 K/s, preferably more than $10^2$ K/s, more preferably more than $10^3$ K/s. In this case, cooling can also take place at cooling rates of more than $10^5$ K/s, $10^6$ K/s or $10^7$ K/s, for example at $5 \times 10^7$ K/s or more, for example using He as the cooling gas. According to specific embodiments, in this case, the further processing takes place in a protective gas atmosphere comprising an inert gas, e.g. Ar, N, He, Ne or mixtures thereof. In this case, the cooling takes place in a preferably controlled manner, for example using inert gas.

In this case, the heating is not particularly restricted and can take place for example by means of convection, lasers, etc., for example to temperatures of 700° C. or more, preferably 750° C. or more, more preferably 800° C. or more.

Owing to the high cooling rate, it can be ensured that the high proportion of Sc which can be in the powder alloy according to an embodiment of the invention, in particular in the secondary phase outside the primary phase, can also be maintained in the material or workpiece, and the Sc is not expelled during production.

As a result of the thermal influence during the further processing of the powder alloy according to an embodiment of the invention or of the wire according to an embodiment of the invention during the production of the material or workpiece or also in the case of components which are produced or interconnected by means of powder metallurgy (e.g. sintering; various ALM processes or also connection processes such as welding) or in the case of connection to another material or other semi-finished products or components (e.g. sheets, profiles, etc.), the heat input or partial melting or complete melting leads to the solid solution being broken up in the powder alloy or the wire with the formation of secondary, dispersed particles, or to said solution being coagulated. As the Sc content increases, the separation is faster and starts earlier. The rate of coagulation of secondary particles during the separation from the mixed crystal likewise increases as the Sc content in the mixed crystal increases, and therefore higher cooling rates are preferred in this case.

According to specific embodiments, after cooling, the material or the workpiece is heated to a temperature of from 100-400° C., preferably to 225-350° C., that is to say, after the cooling at the high cooling rate, additional heating takes place. In this case, said heating can also be suitably adapted with respect to a substrate or additional materials in the material or workpiece. As a result, in particular in the case of ALM technologies or when using a wire according to an embodiment of the invention, a defined deposition from the secondary phase can take place. In the case of temperatures of more than 400° C., coagulation can take place, which is not preferable.

In order to maintain as far as possible the good properties of the Sc-containing aluminium powder alloy or of the wire, according to specific embodiments, during the production of materials or workpieces using melting or partial melting processes, e.g. ALM, spraying, welding, structures having the thinnest possible walls are produced, having wall thicknesses of more than 0 to 100 mm, preferably to 50 mm, more preferably to 10 mm, the workpiece size not being particularly restricted and also possibly being up to 10 m in at least one dimension. The high cooling rates in the method according to an aspect of the invention for producing workpieces or materials contribute to being able to obtain an optimal precipitation distribution of the primary and—in the adjacent, non-melting regions which are nevertheless adversely affected by the influence of heat—also secondary particles and, during subsequent heat treatment, secondary precipitations both in the "melting zone" and also in the rest of the material can be precipitated. As a result, the material exhibits low heat crack sensitivity and thus also suitability for ALM processes of this type.

After the heating, the material or the workpiece can in turn be cooled to ambient temperature (for example 20-25° C., e.g. 20° C.), the cooling not being particularly restricted in this case.

Instead of the additional heating or preferably also subsequent thereto, additional process steps can follow, such as sintering, hot isostatic pressing, compressing, etc., in order to achieve optimal material properties.

According to specific embodiments, in the method for producing the workpieces or materials, the scandium-containing aluminium powder alloy is deposited by means of powder metallurgy. In this case, deposition can take place for example by means of ALM or related technologies, so that for example functional layers comprising the scandium-containing aluminium powder alloy or consisting thereof can be produced.

During the production of the workpieces or materials, by means of the use of the scandium-containing aluminium powder alloy according to an embodiment of the invention and the heating and rapid cooling, coherent, finely distributed secondary phases having sizes of from 1-50 nm, preferably 2-20 nm can be formed, such as can be observed by means of TEM or SEM.

A plurality of materials or workpieces can also be used, or for example various nozzles, in order to produce multifunctional components.

The method according to an aspect of the invention for producing workpieces or materials is suitable in particular for producing components in the aviation industry, automotive engineering, tool manufacture, medical technology, etc., in particular for aerospace applications for structural components in which good mechanical stability is required and which can also be thermally stressed. The individual workpieces, e.g. components or semi-finished products, can be welded together using various welding processes, also using a welding filler material according to the invention, to form larger components made of the same type or different types of materials. The aluminium powder alloy according to an embodiment of the invention or wires, materials or workpieces according to an embodiment of the invention can also be welded, or in the case of the aluminium powder alloy, atomised/sprayed, to other materials/components/sheets/profiles etc. By means of the aluminium powder alloy and wires, materials or workpieces which are produced therefrom, it is possible to improve the static and dynamic properties of the produced materials or workpieces.

Although the present invention has been described on the basis of preferred embodiments, it is not restricted to said embodiments, but rather can be modified in various ways.

By means of the present invention, a scandium-containing aluminium powder alloy is provided which can be used in powder technological processes such as additive layer manufacturing. By using components which are produced by means of ALM or also other powder technological processes, when carrying out an appropriate construction of the components, up to 50% of the manufacturing costs can be saved by comparison with a differential construction technique (e.g. deforming, mechanical machining, connecting the individual parts of the structure). Alongside this, the workpieces or materials which are produced by means of the scandium-containing aluminium powder alloy according to the invention can, inter alia, also provide advantages in terms of weight by means of a possible application in thin-walled structures. The possibility of friction stir welding (FSW), by means of an adapted FSW design of a plurality of parts, can likewise lead to the production of larger, more complex components which are connected by means of FSW. In addition, the component reproducibility and profitability can be increased.

By means of the method according to an aspect of the invention for producing materials or workpieces, in particular customised manufacturing of components can take place, e.g. by means of ALM. Customised manufacturing of components having near-end contours can provide a material saving of up to 90%, which occurs as waste, e.g. for components in aircraft construction. Furthermore, this method allows a type of rapid prototyping for application in all areas of technology such as in automotive engineering, etc. In this case, generative processes support maximum utilisation of materials with a simultaneously high level of component complexity according to manufacturing processes. In the context of ALM technologies, in this case there are different production methods such as powder-bed or powder-nozzle processes or wire-based processes.

A process technology of this type offers, for heavy-duty constructions/components, a load-optimised component construction having versatile, individual configuration options, and optionally having an integrated and integral material construction made of different or also "alloy-related" materials. Properties of a structure having likewise fewer variations in the composition or the structure can thus be produced in a targeted manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a scandium-containing aluminum powder alloy, the method comprising:

melting, spraying or atomizing and cooling at a cooling rate of more than 10 K/s a mixture comprising, in % by weight, based on a total composition of the mixture,

| | |
|---|---|
| Mg | 0.5-10 |
| Sc | 0.1-40 |
| Zr | 0.05-1.5 |
| Mn | 0.01-1.5 |
| Zn | 0-2.0 |
| Ti | 0.01-0.2 |
| Ce | ≤0.25 |
| Be | 0-0.004 |
| B | 0-0.008 |
| Si | ≤0.25 |
| Fe | ≤0.25 |
| Hf | ≤0.5 | at least one selected from La, Pr, Nd, Pm, Sm, Eu, Gd, Tb, Dy, Ho, Er, Tm, Yb, Lu, Y, Ga, Nb, Ta, W, V, Ni, Co, Mo, Li, Th, or Ag in a proportion of at most 0.5, and Al as the remainder, and further comprising impurities in a total of at most 0.5% by weight, wherein the scandium-containing aluminum powder alloy has a primary phase and a secondary phase, wherein particles in the primary phase have a formula of $Al_3(Sc_{1-x}Zr_x)$, $x<1$, and a grain diameter of no greater than 20 μm.

2. The method of claim 1, wherein the Sc is included in an amount of 0.6% to 30% by weight, based on the total composition of the mixture.

3. The method of claim 1, wherein the Zn is included in an amount of 0.2% to 1.0% by weight, based on the total composition of the mixture.

4. The method of claim 1, wherein particles of the scandium-containing aluminum powder alloy have a grain diameter of from 1 to 250 μm.

5. The method of claim 1, wherein a proportion of the Zr is at most half of a proportion of the Sc in the total composition of the mixture.

6. The method of claim 1, wherein a proportion of the sum of the Zr+Ti is less than ⅓ of a proportion of the Sc in the total composition of the mixture.

7. The method of claim 1, wherein the Hf is included in 0.15% to 0.25% by weight, based on the total composition of the mixture.

8. The method of claim 1, wherein a high concentration of the Sc is in the secondary phase of the scandium-containing aluminum powder alloy.

9. A method for producing a wire, comprising:

pressing a scandium-containing aluminum powder alloy comprising, in % by weight, based on a total composition of the scandium-containing aluminum powder alloy

| | |
|---|---|
| Mg | 0.5-10 |
| Sc | 0.1-30 |
| Zr | 0.05-1.5 |
| Mn | 0.01-1.5 |
| Zn | 0-2.0 |
| Ti | 0.01-0.2 |
| Ce | ≤0.25 |
| Be | 0-0.004 |
| B | 0-0.008 |
| Si | ≤0.25 |
| Fe | ≤0.25 |
| Hf | ≤0.5 | at least one selected from La, Pr, Nd, Pm, Sm, Eu, Gd, Tb, Dy, Ho, Er, Tm, Yb, Lu, Y, Ga, Nb, Ta, W, V, Ni, Co, Mo, Li, Th, or Ag in a proportion of at most 0.5, and Al as the remainder, and further comprising impurities of in total at most 0.5% by weight; and drawing the pressed scandium-containing aluminum powder alloy into a wire, wherein the scandium-containing aluminum powder alloy has a primary phase and a secondary phase, wherein particles in the primary phase have a formula of $Al_3(Sc_{1-x}Zr_x)$, $x<1$, and a grain diameter of no greater than 20 μm.

* * * * *